Oct. 15, 1935.  R. B. BOURNE  2,017,747
SOUND ATTENUATING DEVICE
Original Filed April 30, 1934  2 Sheets-Sheet 1

INVENTOR
ROLAND B. BOURNE
BY Chapin & Neal
ATTORNEYS

Oct. 15, 1935.    R. B. BOURNE    2,017,747
SOUND ATTENUATING DEVICE
Original Filed April 30, 1934    2 Sheets-Sheet 2
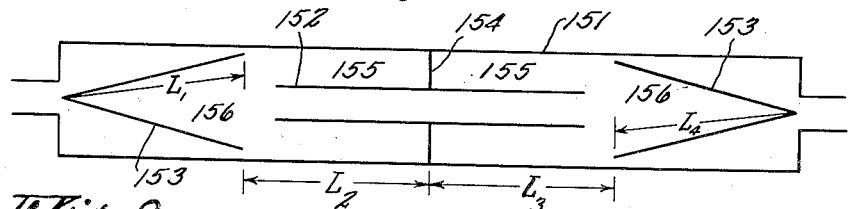
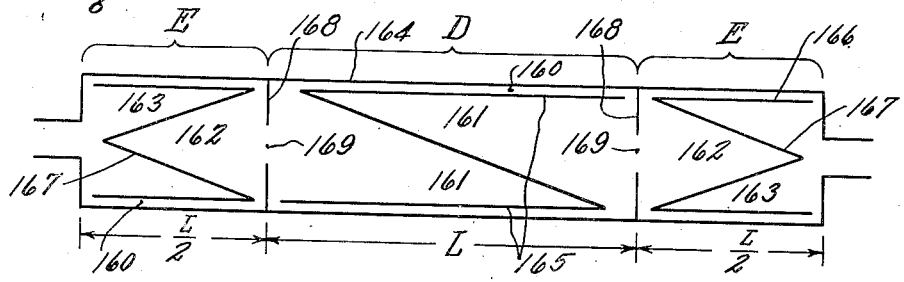
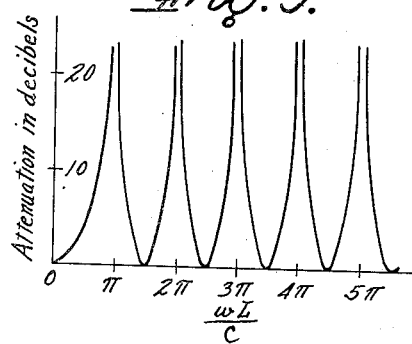
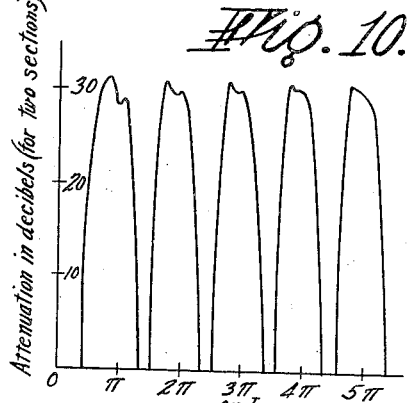
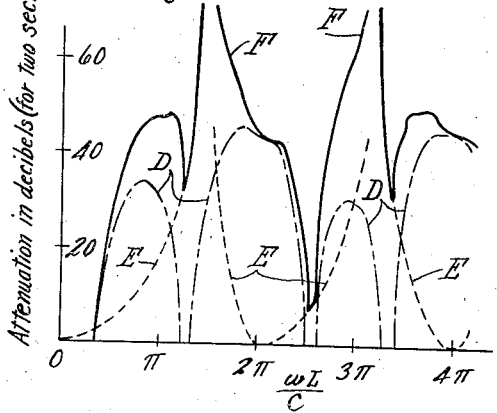
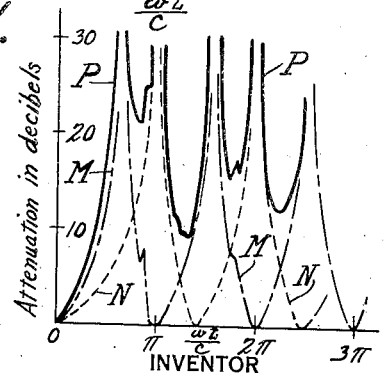
INVENTOR
ROLAND B. BOURNE
BY
Chapin & Neal
ATTORNEYS Patented Oct. 15, 1935

2,017,747

UNITED STATES PATENT OFFICE 2,017,747

SOUND ATTENUATING DEVICE

Roland B. Bourne, Hartford, Conn., assignor to The Maxim Silencer Company, Hartford, Conn., a corporation of Connecticut Original application April 30, 1934, Serial No. 723,085. Divided and this application December 14, 1934, Serial No. 757,553

12 Claims. (Cl. 181—0.5)

The present invention relates to sound attenuating devices of the reactive type wherein one or more acoustic sidebranches capable of showing resonance phenomena are coupled acoustically to a main conducting channel or other enclosure wherein may occur sound waves which are to be attenuated. A primary purpose of the invention is to provide acoustic sidebranches having novel characteristics, and to show how the acoustic characteristics of these sidebranches may be used in connection with the design of sound wave attenuating apparatus. A further purpose of the invention is to show how these characteristics may be applied to the design of silencers for use in connection with the exhausts or intakes of internal combustion engines, air compressors, blowers and the like. Further purposes and objects of the invention will be disclosed as the specification proceeds.

The acoustic sidebranches which are the main subject of this invention are designed and used on the basis that progressive change of phase as a function of distance occurs therein. For the purposes of the invention they will be referred to as "linear sidebranches". As an example of a sound wave attenuating device employing linear sidebranches having progressive change of phase therein, reference is made to Bourne, United States Patent No. 1,910,672, May 23, 1933.

There are in general, two types of linear sidebranches, i. e., those open at both ends, called "open" linear sidebranches and those closed at one end, called "closed" linear sidebranches. When acoustic sidebranches are used in connection with silencers for internal combustion engines and the like, the use of an open sidebranch may not be feasible since both exhaust gas and sound can leave through the open end. The open type sidebranch possesses certain acoustic properties, however, that make it desirable from an acoustic point of view. It is well known that a cylindrical tube of uniform cross sectional area, open at both ends, is substantially one-half wave length long for its fundamental natural period or frequency and also resonates to all substantially harmonic overtones thereof, both even and odd, whereas the closed tube of uniform cross sectional area is approximately one-quarter wave length long for its fundamental frequency and responds to odd harmonics thereof only.

Where reactive sidebranches are used as attenuating means for sound waves associated with exhaust and intakes of internal combustion engines and the like, it is desirable to offer attenuation not only to the fundamental frequency of the sound, but also all its overtones. It is obvious that an acoustic sidebranch which will respond to and attenuate a full series of harmonic tones and be entirely closed except for the point at which it is coupled to the sound-bearing enclosure or conduit is very desirable. Heretofore, it has been impossible to combine the advantages of a closed linear sidebranch with one showing a response to a full series of harmonic overtones, both even and odd.

I have discovered that a sidebranch in the form of a complete cone, open to the main sound channel at its large end and of course closed off at its pointed end, will respond to and attenuate a complete series of harmonic overtones which are substantially multiples of the lowest frequency for which it resonates. In one aspect of the invention I employ such complete cones as closed linear sidebranches in an acoustic silencing device, these sidebranches responding to and attenuating in the main channel or enclosure to which they are acoustically coupled, bands of frequencies, more or less wide, corresponding to and dependent upon the fundamental frequency of the conical sidebranches and all substantially integral multiples thereof, both even and odd. In another aspect of the invention I employ as sidebranches, in an acoustic silencing device, structures having a cross sectional area decreasing with the distance from their junction point with the main channel, sufficiently slender to give substantial attenuation to at least one consecutive overtone of their fundamental frequency, and having an opening into the main channel large enough to make the sidebranch operate mainly as a linear acoustic element.

Referring to the drawings,

Figs. 7 and 8 show acoustic wave filters employing conical sidebranches; and

Figs. 9 to 12 inclusive show theoretical operating characteristics of the devices illustrated in Figs. 2, 5, 6 and 8 respectively.

This application is a division of my prior application Serial No. 723,085, filed April 30, 1934.

In order to understand the operation of the devices of the invention it is useful to make use of impedance relations, since the operation of sidebranches in general can be completely expressed in terms of the acoustic impedance "looking into" the branch.

Figure 1:
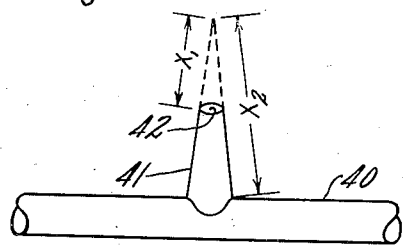
Fig. 1 shows a truncated cone with open base, acoustically coupled to a main conducting channel.

For a truncated cone such as is shown in Fig. 1, the impedance per unit area at the base, or point of coupling to the main channel 40, in terms of the dimensions of the cone 41 having a partition or header 42 a distance $x_1$ from the apex and a slant length of $x_2-x_1$ may be mathematically shown to be $$Z_s = -i\sqrt{P_0\gamma\rho} \cdot \frac{\omega X_2}{C}\left[\frac{\sin\frac{\omega}{C}(X_2-X_1)+\frac{\omega X_1}{C}\cos\frac{\omega}{C}(X_2-X_1)}{\sin\frac{\omega}{C}(X_2-X_1)+\frac{\omega X_1}{C}\cos\frac{\omega}{C}(X_2-X_1)-\frac{\omega X_2}{C}\cos\frac{\omega}{C}(X_2-X_1)+\frac{\omega^2}{C^2}X_1X_2\sin(X_2-X_1)}\right] \quad (1)$$

In the above equation the symbols have the following significances, which hold true also for the further equations below with the changes and additions there noted:

$Z_s$ = acoustic impedance looking into the sidebranch.
$f$ = frequency of sound wave.
$\omega = 2\pi f$.
$C$ = velocity of sound in the medium.
$i = \sqrt{-1}$ $P_0$ = mean pressure of the sound transmitting medium.
$\gamma$ = ratio of the specific heat of the medium at constant pressure to that at constant volume or, for waves of large amplitude, a function of this ratio.
$\rho$ = density of the medium.
$x_1$ = slant distance from the apex of the cone to its closed end (see Fig. 1).
$x_2$ = slant distance from the apex of the cone to its junction with the main conducting channel, allowing for any necessary end correction.

It may be noted, in order to permit comparison with formulas for other types of silencing units given by different authors, that $$-i\sqrt{P_0\gamma\rho} = -i\rho C.$$

In Fig. 1 the conical sidebranch is connected to the main channel at its larger end, and diminishes in cross sectional area in a direction away from the main channel. In the case of a true cone this change in cross sectional area is a simple function of the distance, while for certain sidebranches to be described below, the area depends upon the distance from the channel in a somewhat more complex manner. It should be noted particularly that the sidebranch decreases in area in a direction away from the main channel, as the performance is entirely different if the cone is turned with its small end toward the channel. As will now be shown Equation (1) may be used as the basis for determining many of the acoustical characteristics of either truncated or complete cones connected to the channel at their large ends.

Figure 2:
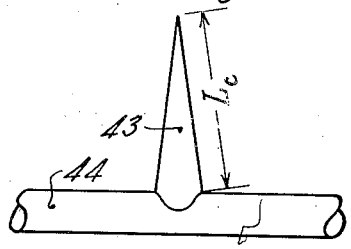
Fig. 2 shows a complete circular cone, continued to the apex, acoustically coupled at its base to a main conducting channel.

In Fig. 2, the truncated cone of Fig. 1 is continued to the apex. In this figure, the cone 43 of length $L_c$ is acoustically coupled to the main conducting channel 44. In this case, $x_1=0$, whence, substituting for $x_2$ its equivalent $L_c$, Equation (1) reduces to $$Z_s = i\sqrt{P_0\gamma\rho}\left(\frac{1}{\cot\frac{\omega L_c}{C}-\frac{1}{\frac{\omega L_c}{C}}}\right) \quad (2)$$

or $$Z_s = i\sqrt{P_0\gamma\rho}\left(\frac{\tan\frac{\omega L_c}{C}}{1-\frac{\tan\frac{\omega L_c}{C}}{\frac{\omega L_c}{C}}}\right) \quad (3)$$

To find the natural frequencies of such a cone, we place $Z_s=0$.

To satisfy this relationship, $$\tan\frac{\omega L_c}{C} = 0$$

whence $$\frac{\omega L_c}{C} = \pi, 2\pi, 3\pi, \text{etc.} = n\pi$$

where $n$ is any positive integer, either even or odd. Therefore $$L_c = n\frac{\lambda}{2},$$

a result identical to that applying to a cylindrical tube open at both ends commonly called an "open" tube.

I now have an acoustical resonating device, completely closed except for an opening whereby it may be acoustically coupled to a main conducting channel and capable of being used to attenuate certain groups of sound frequencies comprising a fundamental group and all multiples thereof, both even and odd. The use of the term group rather than frequency is justified by the fact that resonating devices of the acoustic type exert their influence not only upon the theoretical single frequencies of resonance but also upon neighboring frequencies. The exact nature of the behavior of this type of resonating device under various conditions will be disclosed as the specification proceeds, and the advantages of certain specific arrangements will be shown.

In order to show the attenuating effect of a complete cone acoustically coupled to a main conducting channel upon sound waves therein, it is proper to first investigate the performance of a single such sidebranch, coupled to a relatively long main conducting channel. The attenuation in decibels may be shown to be $$Ndb = 10\log_{10}\left[1+\left(\frac{S_2}{2S_1}\right)^2\left(\cot\frac{\omega L_c}{C}-\frac{1}{\frac{\omega L_c}{C}}\right)^2\right] \quad (4)$$

where $S_2$ is the area of the base of the cone. $S_1$ is the area of the main conducting channel.

A plot of Equation (4) is shown in Fig. 9, for the condition that $S_2/S_1=4$.

Figure 3:
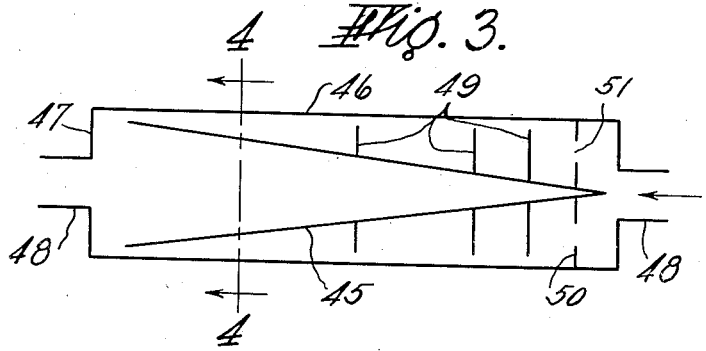
Fig. 3 shows in diagrammatic form a sound attenuating device embodying a single complete cone open at its base.
Figure 4:
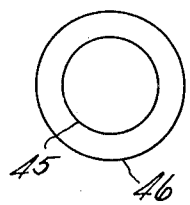
Fig. 4 is a section on line 4—4 of Fig. 3.

In order to obtain a larger area for the base of the cone than exists in the main conducting channel, the cone may be disposed within a casing after the manner shown in Fig. 3. In this embodiment, the cone 45 is supported within the casing 46 in any convenient manner, making due allowance for the passage of gas between the base of the cone and the casing and between the end of the cone and the header 47. The specific supporting construction is not shown in detail as it is not necessary for a complete understanding of the invention. It is seen that the open base of the cone is located directly opposite to and closely adjacent the opening in the header 47 leading into the channel 48 which forms part of the main conducting channel through the device. In this particular embodiment of the invention, the space between the outside of the cone and the inside of the shell or casing is utilized to the purpose of attenuating sounds of relatively high frequency, such as bang and hiss noises usually associated with internal combustion engine exhausts. I have shown a simple baffle plate system 49 to represent such a high frequency attenuating means. Many arrangements of passageways, partitions, etc. may be used to advantage in this regard. The apex of the cone may be supported either by brackets or by a partition 50 extending from the casing to the cone and having therein holes 51 for the passage of the gas therethrough. It is theoretically preferable, in this and other embodiments, that the sidebranch retain its conical shape up to the point of coupling to the main channel. In some cases, however, it may be desirable for constructional reasons to depart from the normal conical shape adjacent the zone of coupling. The departure from the theoretical response occasioned by this slight change in shape will in most cases be of no practical consequence.

Referring again to Fig. 9 it is seen that maximum attenuation occurs at values of $$\frac{\omega L c}{C} = \pi, 2\pi, 3\pi, 4\pi, \text{etc.,}$$

which is the same as would be obtained for an "open" cylindrical tube of the same length. Such a tube would have an attenuation peak at zero frequency. It is to be noted that the conical sidebranch does not offer attenuation to zero frequency, the attenuation decreasing continuously from a high value at $$\frac{\omega L c}{C} = \pi$$

to zero at $$\frac{\omega L c}{C} = 0,$$

as shown. The points of zero attenuation are not midway between the points of maximum attenuation, as they are in the case of the "open" cylindrical sidebranch, but are displaced slightly therefrom, the displacement becoming less as the frequency increases. It can be shown, by a consideration of Equation (4) that the condition for zero attenuation is given by the relation $$\tan \frac{\omega L c}{C} = \frac{\omega L c}{C}$$

The first few roots of this equation are known to be $0, 1.4303\pi, 2.459\pi, 3.471\pi$.

It is seen that these successive values show a decreasing difference from the midway points, namely $1.5\pi, 3.5\pi$, etc. approaching $$\frac{n\pi}{2}$$

as a limit, where $n$ is any odd integer. It is to be noted at this time that the area under the curve is larger as the ratio $S_2/S_1$ is made greater; and, since this area represents a measure of the usefulness, in attenuating sounds of many frequencies, of the device for which the curve shows operating characteristics, it is frequently desirable to make $S_2$ as large compared with $S_1$ as is commercially feasible with proper regard for the limitations imposed by acoustic theory.

Figure 5:
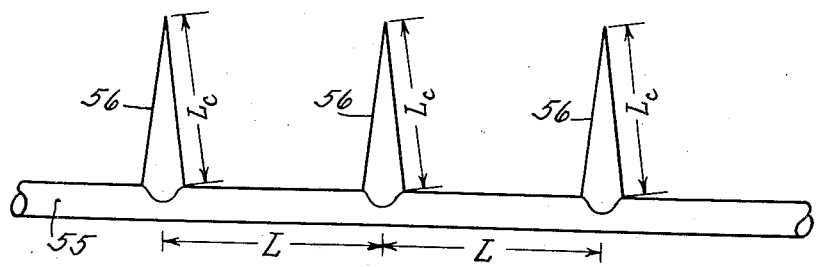
Fig. 5 shows an acoustic wave filter embodying a plurality of complete cones spaced at intervals along the length of a main conducting channel and acoustically coupled to the channel at their bases.

Conical sidebranches of the types described above may be used to form acoustic wave filters. An idealized acoustic wave filter of this type is shown in Fig. 5. It comprises the main conducting channel 55 having openings at intervals (L) along its length, at which points the conical sidebranches 56, of length $L_c$ are acoustically coupled thereto. The attenuation-frequency characteristics may be shown to be given by $$\cosh \gamma = \cos \frac{\omega L}{C} + \frac{S_2}{2S_1} \sin \frac{\omega L}{C} \left( \cot \frac{\omega L c}{C} - \frac{1}{\frac{\omega L c}{C}} \right) \quad (5)$$

where $S_2$ and $S_1$ have their usual meanings, $\gamma$ is the propagation constant and shows attenuation in napiers for real values of $\cosh \gamma$. To convert from napiers to the more usual decibel it is only necessary to multiply by 8.686.

A plot of Equation (5) is shown in Fig. 10. The ordinates are in decibels for two sections of such a filter and the curve is plotted for the condition that $L=L_c$ and $S_2/S_1=4$. It will be noted that the attenuation does not extend to infinity as is the case of the curve shown in Fig. 9. The shape of the curve in Fig. 10 is due to the fact that both the sidebranches and main channel between sidebranches are substantially of the same length. In the case of the curve shown in Fig. 10, the centers of the attenuation bands are displaced slightly toward zero frequency, the displacement becomes less as the term $$1/\frac{\omega L c}{C}$$

of the Equation (5) becomes smaller with increasing frequency.

Figure 6:
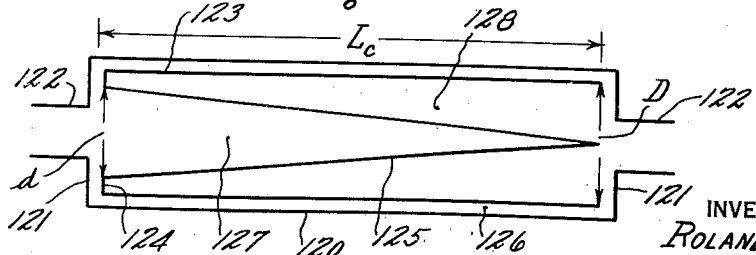
Fig. 6 shows an embodiment of the invention employing a complete cone and a conico-annular chamber as sidebranches.

Fig. 6 shows a simple constructed sound wave attenuation device having unique acoustic characteristics. It comprises a cylindrical casing 120 and end headers 121 fitted with inlet and outlet openings 122. Suitably mounted within said casing is a cylindrical member 123 open at one end and having a diameter D, cross sectional area $S_2$. The member 123 is closed at the other end by a header 124 having a circular opening therein of diameter $d$ and cross sectional area $S_3$. Affixed to the header 124 is a cone 125 extending coaxially within the cylindrical member 123 and of substantially the same length, as shown. It will be seen that the main conducting channel 126 has coupled to it the conical sidebranch 127 and the conico-annular sidebranch 128. One preferred design embraces a certain relation between $S_3$ and $S_2$. By making $S_3=\frac{3}{4}S_2$ the conico-annular sidebranch becomes approximately equivalent to a truncated cone wherein, referring to Fig. 1, $x_2=2x_1$. Letting $x_2-x_1=L_c$, Equation (1) reduces to $$Z_s = -i\sqrt{P_c \gamma \rho} \left[ \frac{1+\frac{\omega L c}{C} \cot \frac{\omega L c}{C}}{\frac{1}{2\omega L c} + \frac{\omega L c}{C} - \frac{1}{2} \cot \frac{\omega L c}{C}} \right] \quad (10)$$

and the attenuating effect of a sidebranch operating in accordance with Equation (10), on sound waves in the main conducting channel may be expressed by $$Ndb = 10 \log_{10}\left[1 + \left(\frac{S_2}{2S_1}\right)\left(\frac{\frac{1}{2\omega Lc} + \frac{\omega Lc}{C} - \frac{1}{2}\cot\frac{\omega Lc}{C}}{1 + \frac{\omega Lc}{C}\cot\frac{\omega Lc}{C}}\right)^2\right] \quad (11)$$

A plot of Equation (11) is shown in Fig. 11, curve M. Curve N, due to the conical sidebranch 127, is similar to that of Fig. 9. The combined effect is shown at P. A feature of the embodiment of the invention shown in Fig. 6 is the short length, made possible by the telescoping of the cone within the cylinder, as shown.

An acoustic wave filter with parallel, unlike, closed acoustic sidebranches is shown in Fig. 7. It comprises a casing 151, a centrally disposed conduit 152, interiorly disposed cones 153, and a header 154, whereby are formed two annular cylindrical closed sidebranches 155 and two conical sidebranches 156. It is seen that one pair of unlike sidebranches is coupled to one end of the conduit 152 and that the other pair of unlike sidebranches is coupled thereto at the other end thereof. For the condition that $L_1 = L_2 = L_3 = L_4$, the operating characteristics may be determined by $$\cosh \Gamma = \cos\frac{2\omega L_1}{C} + \frac{S_2}{2S_1}\sin\frac{2\omega L_1}{C}\left[\cot\frac{\omega L_1}{C} - \tan\frac{\omega L_1}{C} - \frac{1}{\frac{\omega L_1}{C}}\right] \quad (12)$$

By making the various L's of different values, the acoustic properties of the device may be changed at will. Experience has shown that this type of device may be designed to have very low back-pressure in spite of the fact that the gas follows an apparently tortuous pathway therethrough. The space between the outside of the cones 153 and the shell 151 may be used as described in connection with Fig. 3.

Fig. 8 depicts an embodiment of the invention where use is made of both conical sidebranches and simulated truncated conical sidebranches. It comprises essentially an acoustic wave filter, formed by the center section D, in conjunction with the units E which are somewhat similar to the embodiment of Fig. 6. Acoustically, it comprises a main conducting channel 160 having coupled thereto at distant points along the length thereof two sidebranch systems, each comprising a conical sidebranch 161 in parallel with a conical sidebranch 162. In addition, two conico-annular sidebranches 163 are also coupled to the main conducting channel at points near the inlet and outlet of the device. The constructional features involve a cylindrical casing 164 having a central section in which is suitably mounted a pair of cones 165, two end sections in which are suitably mounted the sidebranches 162, 163 formed by a concentrically disposed cylindrical member 166 and an interiorly telescoped conical member 167, the base of which joins the inward end of the member 166. The interior headers 168 are arbitrary and their purpose is to bend the main conducting channel in to the center of the device through openings 169 therein whereby the open bases of the conical sidebranches 161, 162 are brought into closer acoustic relation with the main conducting channel 160. For an acoustic wave filter having conical sidebranches of length L and L/2 paralleled at a distance L apart along the main conducting channel, as shown, the operating characteristics may be shown to be given by $$\cosh \Gamma = \cos\frac{\omega L}{C} + \frac{S_2}{2S_1}\sin\frac{\omega L}{C}\left[\cot\frac{\omega L}{C} + \cot\frac{\omega L}{2C} - \frac{\omega L}{3}\right] \quad (13)$$

A plot of Equation (13) is shown in Fig. 12, curve D. The attenuating action of sidebranches 163 is given approximately by $$Ndb = 10 \log_{10}\left[1 + \left(\frac{S_2}{2S_1}\right)^2\left(\frac{\frac{4}{3\omega L} + \frac{\omega L}{4C} - \frac{2}{3}\cot\frac{\omega L}{2C}}{1 + \frac{\omega L}{4C}\cot\frac{\omega L}{2C}}\right)^2\right] \quad (14)$$

The equation is plotted as curve E in Fig. 12 and the combined effect of D and E is plotted at F. By omitting the headers 168 or by having suitable drain holes near the periphery thereof, the device becomes suitable for service where water is introduced into the exhaust system such as is common practice in many marine installations.

I claim:

1. An acoustic wave filter comprising a main sound conducting channel having coupled acoustically thereto, at intervals along its length, sets of closed acoustic sidebranches of the linear type, in parallel, one sidebranch of each of said sets having a cross sectional area which decreases continuously as a function of the distance from the point of coupling to said main sound conducting channel.

2. An acoustic wave filter in accordance with claim 1 wherein at least one of said sidebranches comprising a paralleled set is in the form of a complete closed cone with open base.

3. An acoustic wave filter in accordance with claim 1 wherein one of said sidebranches comprising a set is in the form of a complete closed cone with an open base and another of the sidebranches comprising the set has a constant cross sectional area throughout its length.

4. A sound attenuating device comprising a generally cylindrical casing having an inlet opening in one end and an outlet opening in the other end thereof, a transverse partition dividing the interior of said casing into two compartments, an axially disposed conduit extending through said partition from the interior of one of said compartments to the interior of the other of said compartments, a complete closed cone disposed in each of said compartments whereby is formed, at each end of said axially disposed conduit, a linear acoustic sidebranch of constant cross sectional area in parallel with a conical acoustic sidebranch.

5. A sound wave attenuating device comprising a cylindrical casing having inlet and outlet openings at the respective ends thereof, two transverse partitions dividing the interior of said casing into three compartments, openings in said partitions whereby the three compartments are acoustically connected in series, the inner compartment having disposed therewithin a pair of open base cones, the apex of one at the base of the other, each of said open bases being adjacent to the opening in said partition, each of the outer of said compartments having disposed therewithin a cylindrical member, the inside end of which coincides with and is affixed to the base of a complete closed cone which extends inwardly of said cylindrical member, said open base of said cone being adjacent to the opening in said partition, all of said interiorly disposed members being of such dimensions that a path is formed exteriorly thereof and adjacent to said casing.

6. An acoustic wave filter comprising a main sound conducting channel and a plurality of sets of closed sidebranches of the linear type acoustically coupled thereto at intervals along its length, the sidebranches in each set being coupled in parallel to the main channel and being in the form of complete cones open at their bases.

7. An acoustic wave filter comprising a main sound conducting channel and a plurality of sets of closed sidebranches of the linear type acoustically coupled thereto at intervals along its length, the sidebranches in each set being coupled in parallel to the main channel and being in the form of complete cones open at their bases, one of the cones of each set being substantially twice as long as the other of said cones.

8. An acoustic wave filter comprising a main sound conducting channel, a plurality of sets of closed sidebranches of the linear type acoustically coupled thereto at intervals along its length, the sidebranches in each set being coupled in parallel to the main channel and being in the form of complete cones open at their bases, and one or more conico-annular sidebranches acoustically coupled to said main channel.

9. An acoustic wave filter comprising a casing, a conduit extending partially through the casing and spaced from the walls thereof, a partition located substantially centrally of the casing and extending from its inner wall to the conduit, whereby the annular space between the casing and the conduit is divided into two oppositely opening sidebranches each having a constant cross sectional area throughout its length, and a pair of complete hollow cones with open bases located concentrically within the casing with their open bases adjacent the ends of the conduit.

10. An acoustic wave filter comprising a casing, a pair of nested oppositely facing complete hollow cones with open bases located within the casing so as to provide an acoustic channel between them and the inside of the casing, and a pair of oppositely facing complete hollow cones with open bases located within the casing with their open bases adjacent the open bases of the nested cones, said second pair of cones being spaced from the casing wall so as to provide an acoustic channel surrounding said cones.

11. An acoustic wave filter comprising a casing, a pair of nested oppositely facing complete hollow cones with open bases located within the casing so as to provide an acoustic channel between them and the inside of the casing, and a pair of oppositely facing complete hollow cones with open bases and of lengths substantially one-half of the lengths of the first pair of cones, said second pair of cones being located within the conduit with their open bases adjacent the open bases of the nested cones and being spaced from the casing wall so as to provide an acoustic channel surrounding said cones.

12. An acoustic wave filter comprising a casing, a pair of nested oppositely facing complete hollow cones with open bases located within the casing so as to provide an acoustic channel between them and the inside of the casing, a pair of oppositely facing complete hollow cones with open bases located within the casing with their open bases adjacent the open bases of the nested cones, and cylindrical members surrounding said second pair of cones and connected to the large ends thereof so as to provide conico-annular sidebranches opening oppositely to the cones, said cylindrical members being spaced from the casing wall to provide an annular acoustic channel.

ROLAND B. BOURNE.

Certificate of Correction

Patent No. 2,017,747.　　　　　　　　　　　　　　　　　　　　October 15, 1935.

ROLAND B. BOURNE

It is hereby certified that errors appear in the printed specification of |the above numbered patent requiring correction as follows: Page 3, second column, line 17, for "cosh $\gamma$" at extreme left of formula read *cosh* $\Gamma$; line 22, for "$\gamma$" read $\Gamma$; and line 24, for "cosh $\gamma$" read *cosh* $\Gamma$; page 4, first column, Equation (11), for the first group of characters within the bracket $$"1+\left(\frac{S_2}{2S_1}\right)" \text{ read } 1+\left(\frac{S_2}{2S_1}\right)^2;$$

same page, second column, line 21, Equation (13), for the extreme right group of characters $$\frac{\omega L}{\frac{3}{C}} \text{ read } \frac{\frac{3}{\omega L}}{C};$$

and that the said Letters Patent should be read with these corrections therein that the same may conform to the record of the case in the Patent Office.

Signed and sealed this 19th day of November, A. D. 1935.

[SEAL]　　　　　　　　　　　　　　　　　　　　LESLIE FRAZER,
　　　　　　　　　　　　　　　　　　　　　　*Acting Commissioner of Patents.*